April 17, 1956     W. G. WILKINS     2,741,817
HEAT DISPOSABLE PATTERN FOR MOLDING A BLADE CAVITY
Filed Aug. 3, 1950     3 Sheets-Sheet 1

INVENTOR
William G Wilkins
By Carlson, Pitzner, Hubbard & Wolfe
ATTORNEY

April 17, 1956 W. G. WILKINS 2,741,817
HEAT DISPOSABLE PATTERN FOR MOLDING A BLADE CAVITY
Filed Aug. 3, 1950 3 Sheets-Sheet 2

INVENTOR
William G. Wilkins
By Carlson, Pitzner, Hubbard & Wolfe
ATTORNEYS

April 17, 1956     W. G. WILKINS     2,741,817
HEAT DISPOSABLE PATTERN FOR MOLDING A BLADE CAVITY
Filed Aug. 3, 1950     3 Sheets-Sheet 3
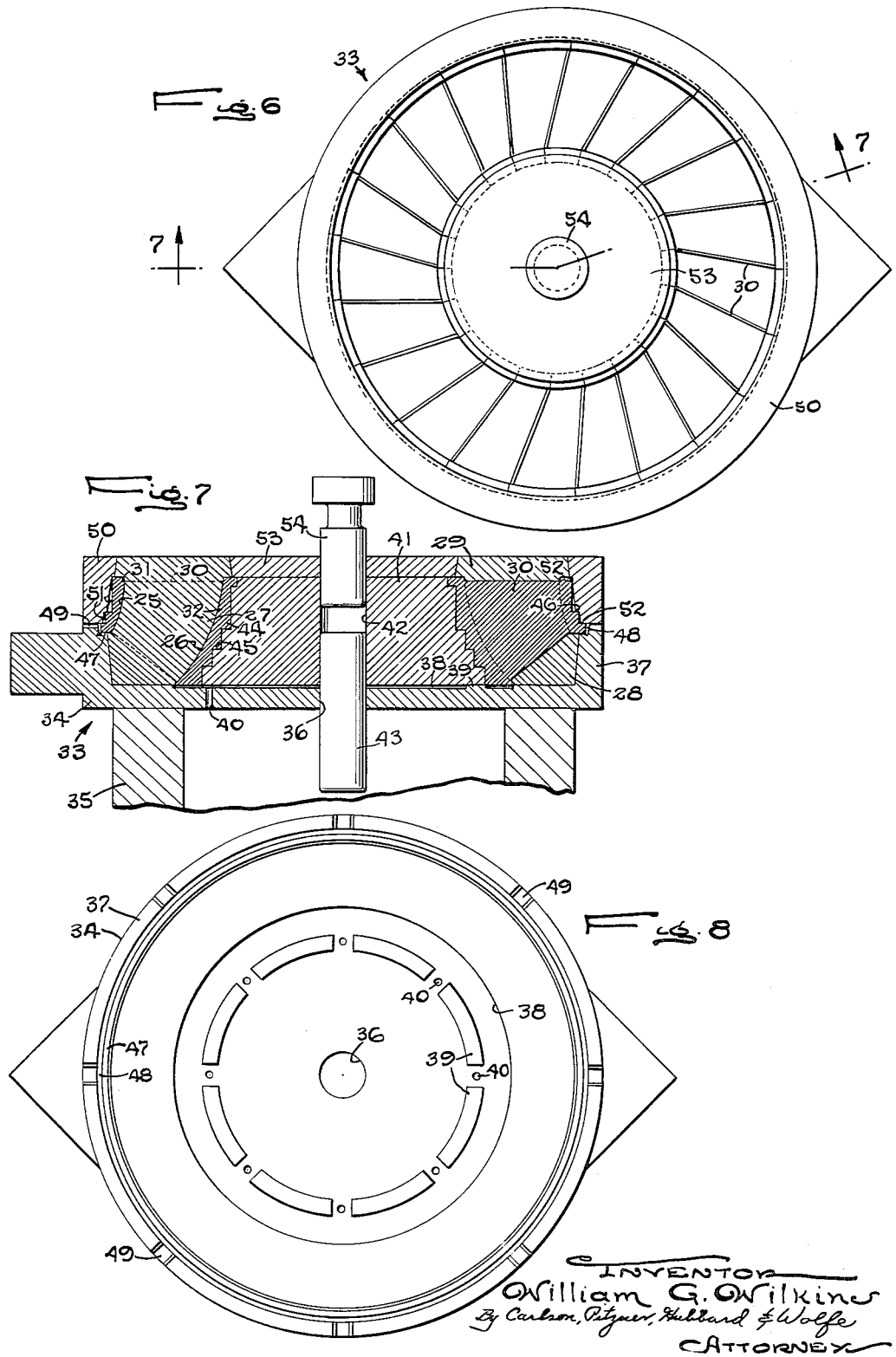

United States Patent Office 2,741,817
Patented Apr. 17, 1956

2,741,817

HEAT DISPOSABLE PATTERN FOR MOLDING A BLADE CAVITY

William G. Wilkins, Chicago, Ill., assignor to Universal Castings Corporation, Chicago, Ill., a corporation of Illinois Application August 3, 1950, Serial No. 177,354

5 Claims. (Cl. 22—158)

The present invention relates to a new and improved method of making cores for casting multi-blade wheels.

Destructible cores are commonly required for casting multi-blade wheels. Heretofore, such cores for wheels with complex blade form have been built up of separate core segments which at their lines of contact tend to result in the formation of fins on the blades of the cast wheels. One of the primary objects of the present invention is to avoid the difficulties inherent in segmental cores by making a new and improved core which is formed in a one-piece or unitary structure having all of the blade slots opening integrally therethrough.

Another object is to provide a method of making a unitary core of the foregoing character having a smooth and true surface finish so that the wheel cast therefrom will not require machining to remove fins, burrs or other surface defects.

A further object is to provide a method of making a unitary core, which method is simple, reliable and expeditious in practice, and which affords good size control.

Another object is to provide a method of making a unitary core, which method will produce a core that is relatively inexpensive and yet very accurate in shape and dimensions.

Further objects reside in the use of novel core blades and a novel core box for mounting the blades in the molding of the core.

Another object is to provide a method of making a one-piece core which comprises molding the core blades in a body matrix of plaster or the like, and then melting out the core blades to leave clean blade slots in the matrix.

Further objects and advantages will appear as the description proceeds.

In the accompanying drawings, Fig. 1 is a fragmentary plan view of a casting mold adaptel to utilize a core made according to the method of the present invention.

Fig. 6 is a plan view of a core box for molding the core and shown with the core blades mounted therein.

Fig. 7 is an axial sectional view of the core box taken along line 7—7 of Fig. 6, and showing the core box filled with molding plaster.

Fig. 8 is a plan view looking down on the face ring of the core box.

Figure 1:
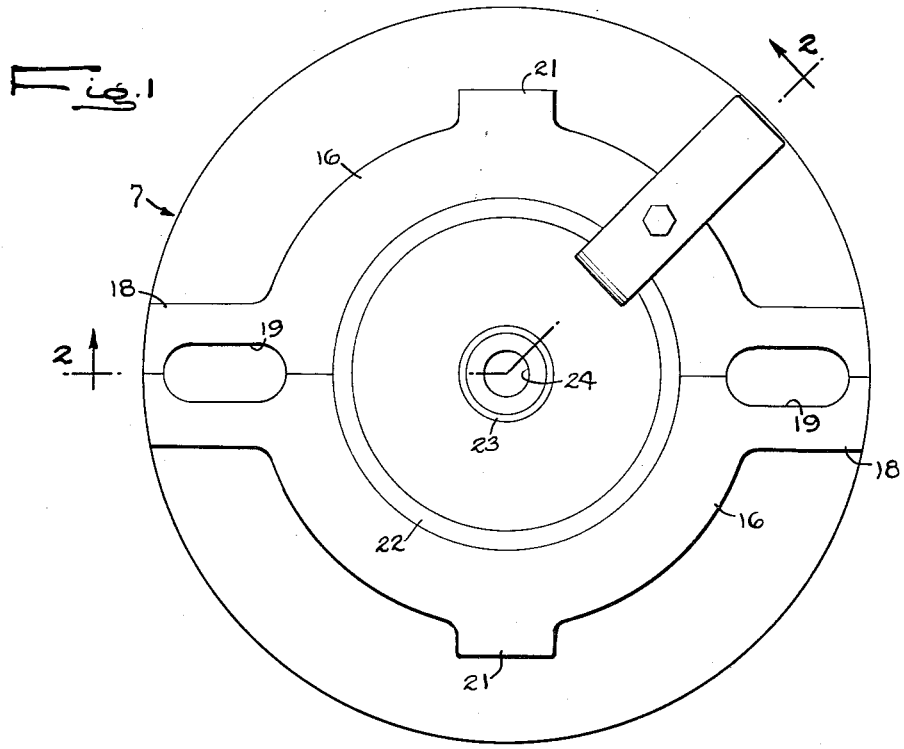

Referring more particularly to the drawings, the method of the present invention is especially suited for making a unitary or one-piece core to be used in the casting of multi-blade wheels. Due to the advantageous physical characteristics of the core, particularly in respect of accuracy in form and dimensions and over-all surface smoothness, the method in its ultimate aspects may be aptly characterized as a method of casting such wheels.

The method is not necessarily limited in its use to the casting of any particular type or form of multi-blade wheel, but is especially advantageous for wheels having blades of complex shape. A typical wheel 1 of this character, and constituting the stator wheel of one current form of automatic transmission for automobiles, is disclosed for the purpose of illustrating the present invention.

The stator wheel 1, in the exemplary form shown, comprises a central hub disk 2 having an axial opening 3, an inner flared rim member 4 integral with the disk, a spaced outer concentric rim member 5, and an annular series of like blades 6 uniformly spaced, and integral with and bridging the space between the rim members. The blades 6 are of curved and of varying thickness from the leading edge to the trailing edge, and hence are of such complex form that they have no natural parting and cannot be molded or cast by ordinary foundry practice.

The stator wheel 1 is cast from any suitable metal, such, for example, as aluminum, in a permanent mold, indicated generally at 7, and including a suitable core, indicated generally at 8 and complemental in shape to the rim members 4 and 5 and the blades 6. It is with the production of the core 8, in a unitary or one-piece structure, that the present invention is primarily concerned.

It will be understood that the permanent mold 7 may be of any suitable conventional structure defining a molding cavity 9 which in cooperating with the core 8 defines a confined space of the required configuration to produce the wheel 1. In the present instance, the mold 7 comprises a base block 10 of circular form and formed with an axial bore 11. The bottom surface of the block 10 is flat and adapted to rest on a suitable support (not shown). The top or inner surface of the block 10 is formed with an annular groove 12 defining a portion of the mold cavity 9, and outwardly thereof with a second annular groove 13 defining a sprue passage. A tubular bushing 14 is fixed in the bore 11, and has a knockout pin 15 extending therethrough.

A diametrically-split tubular side wall 16 has a complemental recess 17 in the underside snugly receiving the base block 10. The side wall 16 circumscribes the block 10, then extends across the sprue passage 13 and then extends upwardly at a reduced diameter in substantial registry with the outer side surface of the groove 12 to define the outer peripheral surface of the mold cavity 9. Two radial protuberances 18 are formed on the side wall 16 at the plane of split, and are formed with sprue passages 19 open to the passage 13 and through ports 20 (one shown) to the mold cavity 9. The passage 13 may open through shorter protuberances 21 to the cavity 9 at points spaced 90° from the ports 20.

Telescopically fitted within the reduced portion of the tubular side wall 16 is an insulated center member 22 which defines the upper surface of the mold cavity 9, and coacts with the center portion of the block 10 and the bushing 14 to shape the hub disk 2 of the wheel 1. A plaster-lined tube 23 extends axially through the member 22, and has a center bore 24 into which the metal may rise to insure a completely filled mold.

Figure 2:
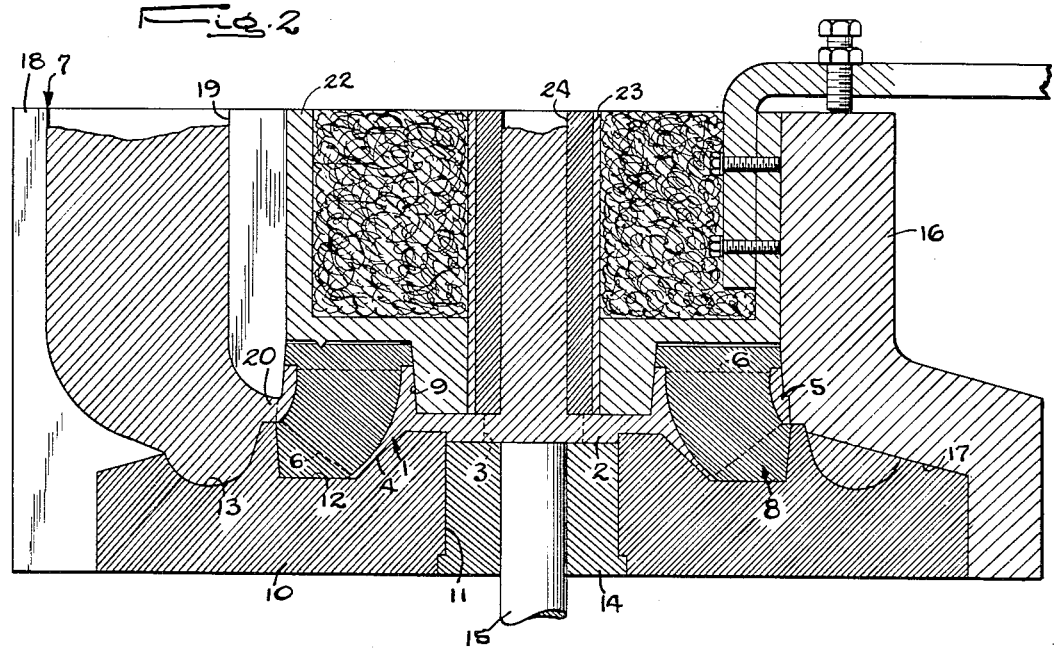
Fig. 2 is an axial sectional view taken substantially along line 2—2 of Fig. 1.
Figure 3:
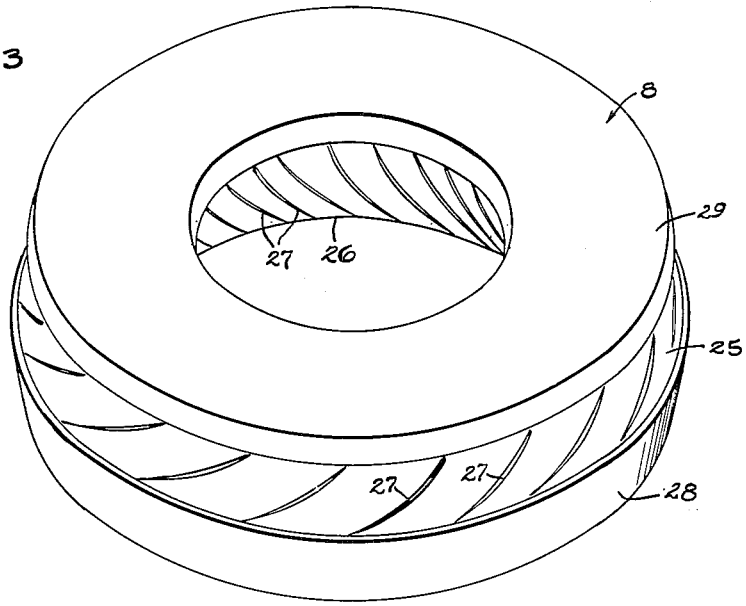
Fig. 3 is a perspective view of the core.
Figure 4:
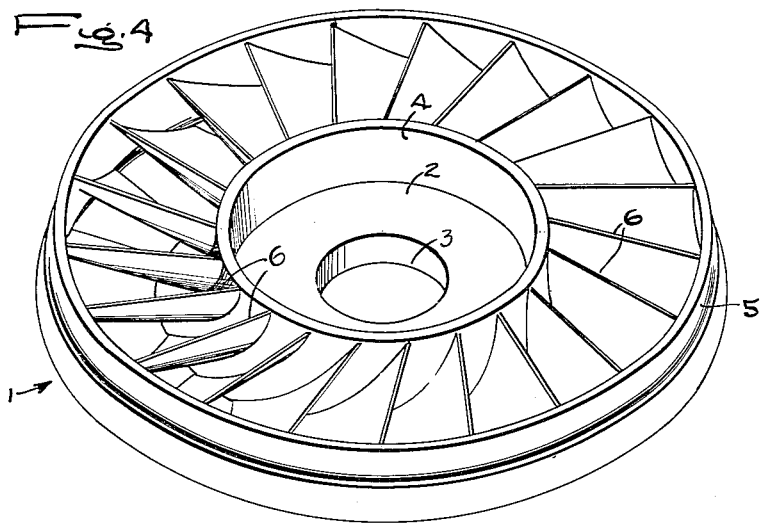
Fig. 4 is a perspective view of the multi-blade wheel casting made in the mold.
Figure 5:
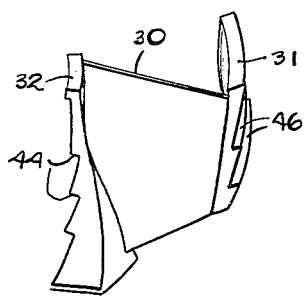
Fig. 5 is a perspective view of one of a series of core blades used in making the core.

With the core 8 in position, it coacts with the various elements of the mold, i. e. the elements 10, 14, 16, 22 and 23, to define an interior space corresponding exactly to the shape of the multi-blade wheel 1, and indicated in axial section by the simple cross-hatching inwardly of the port 20 in Fig. 2. A central portion of the cast metal, in the riser 24 is, of course, removed to form the hole 3 after the wheel 1 has been cast and ejected from the mold.

In particular, the core 8 is used principally to form the wheel blades 6 and hence the inner surfaces of the rims 4 and 5. Thus, the core 8 consists of an annular block which is formed in the outer periphery with a groove 25 for the rim 5, and in the inner periphery with a groove 26 for the rim 4, and with slots 27 opening therethrough from the groove 25, inwardly or generally radially, to the groove 26 for the blades 6. Portions 28 and 29 of the core block beyond the edges of the grooves 25 and 26 substantially fill the upper and lower portions of the outer annulus of the mold cavity 9, and are in accurately locating contact with contiguous surfaces of the mold elements.

In the method of making the core 8, it is formed about a plurality of heat disposable core blades or patterns 30 which are exact counterparts of, and correspond in number and spacing to the blades 6 of the wheel 1, and which, when removed from the core, leave the blade slots 27. To provide means for holding the core blades 30 in assembled relation, they are also formed at their opposite side margins with transverse flanges 31 and 32. Preferably, the flanges 31 and 32 extend in opposite directions so that the blade structure is of generally Z-section. The free end edge surfaces of the flanges 31 and 32 are complemental so that the flanges of each set will interfit when assembled to form a closed annulus.

Thus, the flanges 31 form an annulus to define the outer groove 25 in the core 8, and the flanges 32 form an annulus to define the inner groove 26. The flanges 31 and 32 extend completely from one side or other of the blade bodies, and the free end edge surfaces thereof follow the contour of the blade surfaces so that the lines of interfitting contact of the assembled flanges will be at the corner junctures with the blades, thereby avoiding the formation of fins on the core surfaces.

The core blades 30, with their flanges 31 and 32, may be made of any suitable material and in any suitable manner. The material should be such that it will melt at a relatively low temperature so as to facilitate removal from the core 8. It should be such that when removed from the core 8, it will leave clean cavities with good surface finish. It should have a very small, and preferably substantially zero, coefficient of expansion and contraction. While various materials satisfying these general specifications might be used, an alloy comprising substantially 55% of bismuth and 45% of tin, and having a melting point of approximately 300° F., has been found to be satisfactory. This alloy molds accurately and affords good size control.

In the exemplary method, the core blades 30 are formed individually of this alloy in suitable die molds (not shown). The core blades 30 are then coated with a thin surface film of a thermoplastic material to prevent tight adherence to the body material of the core 8. A suitable coating material comprises molten beeswax in carbon tetrachloride in which the blades 30 are dipped. The presence of the carbon tetrachloride causes the wax to enter the liquid state at a considerably lower temperature than would be required for melting the wax alone, dilutes and thins the wax to insure a thin uniform coating on the blades, and effects quick drying.

The dipped core blades 30 are assembled in an annular arrangement, and clamped in position within a suitable core box 33 adapted for molding the core 8. In the present instance, the core box 33 comprises a circular base ring 34 adapted to rest on a suitable support 35, and is formed with a central opening 36 and an upstanding circular flange 37. The base ring 34 is formed in the top surface with a shallow circular depression 38, and an annular series of spaced arcuate pads 39 rise from the floor of this depression, with suitable vent holes 40 opening through the ring from between the pads. Resting on the pads 39 and coincident in outside diameter therewith is a generally circular centerpiece 41 having an axial bore 42 opening therethrough. A dowel pin 43 extends from the bore 42 through the hole 36 to center the piece 41.

The plate 34, flange 37 and centerpiece 41 define an upwardly opening groove forming the base portion of the molding cavity for the core 8, and adapted to receive and locate the core blades 30 in annularly assembled relation. In the method, the blades 30 are dropped loosely into the groove thus defined. Although the flanges 31 and 32 may vary in shape for different types of wheels, they are formed in the present instance with a plurality of shoulders adapted to effect accurate location in the core box 33 and to prevent canting.

More particularly, the inner peripheral face of the annulus defined by the series of flanges 32 is serrated, i. e. formed with a series of stepped annular notches 44, namely, four notches in the present instance, which interfit with complementary annular notches 45 formed in the outer periphery of the centerpiece 41. The lower edge portions of the flanges 32 overlie the depression 38 just outwardly of the pads 39 to provide clearance so that blade location is determined by the interengagement of the notches 44 and 45. Similarly, the outer peripheral face of the annulus defined by the series of flanges 31 is formed with the series of notches 46 defining upwardly facing shoulders. The lower flanged edge of the annulus formed by the flanges 31 extends into and seats downwardly against the bottom surface or shoulder 47 of an annular notch 48 formed in the inner peripheral edge portion of the flange 37, this notch having peripheral clearance so as to permit the core blades 30 to be inserted loosely in position. Thus, the core blades 30 are accurately located axially of the core box 33 and are held against canting. Vent passages 49 open outwardly from the notch 48 to the exterior of the flange 37.

Suitable means is provided for contracting the annularly arranged core blades 30 inwardly against the centerpiece 41 and in tight interfitting end to end engagement, and then clamping the blades securely in position. In the present instance, this means comprises a wedge ring 50 adapted to be placed about the annulus defined by the series of flanges 31 and having inclined cam faces 51 on the inner surface in wedge engagement with outer edges on the core blades 31 defined by the notches 46. As the ring 50 is forced downwardly, the annular cam faces 51 act against these edges to force the core blades 30 radially inwardly so as to contract them annularly and thereby to seat them tightly against the centerpiece 41. Finally, as the ring 50 bottoms on the flange 37, shoulders 52 thereon engage the bottom sides of the notches 46 and the top face of the flanges 31, respectively, to hold the outer portions of the core blades 31 in position.

A cover plate 53 is adapted to be positioned coaxially on the centerpiece 41 and is centrally located by a dowel 54 extended therethrough into the bore 42. The cover plate 53 overlaps and engages the upper inner peripheral marginal edge portion of the annulus defined by the flanges 32 to hold the inner portions of the core blades 30 in position.

The blade flanges 31 and 32 together with the plate 34 and flange 37 below the blade flanges, and the opposed edge surfaces of the ring 50 and plate 53 above the blade flanges, together, form the molding cavity for the bonding matrix of the core 8, this cavity defining the radial sectional form of the core as it appears in Fig. 2.

After the core blades 30 have been assembled and clamped in the core box 33, the box is filled, flush with the top of the cover plate 53, with a matrix material to form the body of the core 8. While any suitable material may be employed, a wet mix of industrial molding plaster has been found to be satisfactory. One suitable form of such plaster comprises the following ingredients, substantially in the following proportions by weight:

| | Percent |
|---|---|
| Calcium sulphate | 70 |
| Magnesium silicate | 27 |
| Terra Alba and sugar | 3 |

For use, the plaster is mixed with a proper amount of water to obtain the desired molding consistency. Such plaster will set in a comparatively short time and is inhibited against cracking.

After the plaster has set, with the core blades 30 molded therein, the green core 8 is removed from the core box 33 and heated in a suitable oven (not shown) at a suitable temperature and for a sufficient time to melt out the flanged core blades 30. Assuming that the blades 30 are molded of the aforesaid alloy, the metal will melt and run out if heated to a temperature of approximately 500° F. for a period of two and one-half hours. The core 8 is, of course, suitably supported during the heating operation to facilitate drainage of the metal. The core 8 is now removed and subjected to a spinning action so as to remove any remaining traces of metal by centrifugal force.

The thin surface film of beeswax, with which the core blades were coated, insures complete removal of the metal so as to leave clean notches 25 and 26 and blade slots 27 in the core. The coating serves to protect the surfaces of the blades against oxidation, which tends to occur rapidly in the presence of the moisture in the plaster especially at the elevated temperature to which the blades are exposed before melting occurs. It has been found that without such coating or its equivalent, the metal of the core blades 30 will tend to penetrate the plaster matrix, and, in any event, will tend to stick to the surfaces of the plaster body, with the result that the metal may not be completely removed by drainage or plaster will come out with the metal, thereby impairing the accuracy of the core. Since the alloy has practically zero coefficient of expansion and construction, it will not change in size or shape upon being heated to the melting point, and therefore will not impose any strains on the plaster.

After removal of the flanged core blades 30, the plaster core 8 is already rigid in construction and may be used in the casting mold 7. Preferably, however, to provide increased strength, the core 8 is placed in a suitable oven and heated to a curing temperature, as for example 1200° F. for a period of one hour.

It will be evident that the mold 8 is of a unitary or one piece construction. It is economical to produce and is efficient and reliable in use. The surfaces of the notches 25 and 26 and the blade slots 27 are smooth, and will not result in the formation of any fins or other surface defects on the cast wheel 1. Consequently, the cast wheel 1 when removed from the mold 7 is ready for use without requiring any machining or finishing of the internal surfaces, e. g., the inner surfaces of the rims 4 and 5 and the surfaces of the blade 6.

It is to be understood that the heat treatment is subject to variation depending on the thermal properties of the material used in the core blades and core body.

I claim as my invention:

1. A heat disposable pattern used for molding a blade cavity in a core, said pattern being molded of an alloy having a low melting point and comprising a blade body having leading and trailing edges, a flange integral with and extending transversely from one side of said body, a flange integral with and extending transversely from the other side of said body, said flanges being shaped at their opposite end edges to conform to the contour of the blade body at the adjacent side thereof whereby to permit a series of said blades to be assembled in a core box in spaced annular relationship therein with the end edges of the flanges in end-to-end abutment, said abutting flanges of said series, defining a closed annulus at each side of the blades.

2. A heat disposable pattern used for molding a blade cavity in a core, said pattern being molded of an alloy having a low melting point and comprising a blade body having leading and trailing edges, a flange integral with and extending transversely from one side of said body, a flange integral with and extending transversely from the other side of said body, said flanges being shaped at their opposite end edges to conform to the contour of the blade body at the adjacent side thereof whereby to permit a series of said blades to be assembled in a core box in annular relationship with said end edges of the flanges in abutment.

3. A heat disposable pattern according to claim 2 coated with a thin surface film of beeswax.

4. A heat disposable pattern used for molding a blade cavity in a core, said pattern being formed of a thermoplastic material and comprising a curved blade body, a transverse flange integral with at least one side of said blade body, the opposite end edges of said flange being of complemental shape and conforming to the shape of the adjacent side of said body so that a series of the blades may be assembled in annular spaced relation in a core box, with the flanges at said one side of the blade bodies of the series in end to end abutment to form a closed annulus at said one side of said bodies, said flanges of the series of bodies serving to space said blade bodies.

5. A heat disposable pattern according to claim 4 coated with a thin surface film of beeswax.

References Cited in the file of this patent

UNITED STATES PATENTS

| Number | Name | Date |
|---|---|---|
| 19,258 | Nishwitz | Feb. 2, 1858 |
| 1,310,768 | Nugent | July 22, 1919 |
| 1,658,084 | Hudson | Feb. 7, 1928 |
| 2,056,048 | Gregory | Sept. 29, 1936 |
| 2,136,404 | Wheeler | Nov. 15, 1938 |
| 2,204,123 | Collins | June 11, 1940 |
| 2,301,140 | Pfeiffer | Nov. 3, 1942 |
| 2,336,231 | Dodge | Dec. 7, 1943 |
| 2,538,002 | Dearing et al. | Sept. 12, 1944 |
| 2,388,299 | Thielemann | Nov. 6, 1945 |
| 2,391,715 | Kloss | Dec. 25, 1945 |
| 2,400,831 | Kohl | May 21, 1946 |
| 2,435,858 | Whitehead | Feb. 10, 1948 |
| 2,479,039 | Cronstedt | Aug. 16, 1949 |
| 2,508,546 | Skinner | May 23, 1950 |
| 2,510,417 | Rehklau | June 6, 1950 |
| 2,510,735 | Bodger | June 6, 1950 |
| 2,632,396 | Koskinen | Mar. 24, 1953 |